United States Patent [19]
Masuda

[11] Patent Number: 5,384,523
[45] Date of Patent: Jan. 24, 1995

[54] THREE-DIMENSIONAL LASER COORDINATE TRANSFORMATION SYSTEM

[75] Inventor: Teruo Masuda, Minamitsuru, Japan

[73] Assignee: Fanuc Ltd., Minamitsuru, Japan

[21] Appl. No.: 227,483

[22] Filed: Apr. 14, 1994

Related U.S. Application Data

[63] Continuation of Ser. No. 862,532, filed as PCT/JP91/01414, Oct. 16, 1991, published as WO92/08172, May 14, 1992, abandoned.

[30] Foreign Application Priority Data

Nov. 1, 1990 [JP] Japan .................................. 3-296377

[51] Int. Cl.⁶ ............................................ G05B 19/39
[52] U.S. Cl. ................................. 318/568.19; 395/86
[58] Field of Search ............ 318/560, 561, 567, 568.1, 318/568.11, 568.12, 568.15, 568.19, 568.22, 569, 579-601, 625; 364/725; 395/80, 82, 85-89

[56] References Cited

U.S. PATENT DOCUMENTS

| | | | |
|---|---|---|---|
| 4,823,279 | 4/1989 | Perzley et al. | 395/86 |
| 4,887,222 | 12/1989 | Miyabe et al. | 395/86 |
| 4,945,493 | 7/1990 | Huang et al. | 318/568.19 X |
| 4,954,762 | 8/1990 | Miyake et al. | 318/568.19 |
| 5,157,315 | 9/1992 | Miyake et al. | 318/568.19 X |
| 5,191,639 | 3/1993 | Hara | 395/86 X |

FOREIGN PATENT DOCUMENTS 0182918 6/1986 European Pat. Off. .
0286682 10/1988 European Pat. Off. .

OTHER PUBLICATIONS

Patent Abstracts of Japan, vol. 9, No. 312 (P-411) (2035) 7 Dec. 1985: "Coordinate System Setting Device in Numerical Controller", Hideaki Kawamura.

Primary Examiner—William M. Shoop, Jr.
Assistant Examiner—David Martin
Attorney, Agent, or Firm—Staas & Halsey

[57] ABSTRACT

A three-dimensional laser coordinate transformation system for a three-dimensional laser machining apparatus includes a preprocessing calculation unit (4) decodes a machining program stored in a memory (2) and outputs a command value for each axis. Coordinate transformation unit (8, 9) transform the command value into a command value on the coordinate system of an actual workpiece by a coordinate transformation matrix, and the transformed coordinate command value is interpolated by an interpolation means (11) to output an interpolation pulse. Servo motors (21, 22, 23, 24, 25) are driven in response to the interpolation pulse to thereby machine the workpiece.

6 Claims, 16 Drawing Sheets

$$M_{xp} = \begin{bmatrix} \cos\gamma & , & \sin\gamma & , & 0 \\ -\sin\gamma & , & \cos\gamma & , & 0 \\ 0 & , & 0 & , & 1 \end{bmatrix} \quad ----(2)$$

$$\cos\gamma = \frac{XPX}{\sqrt{(XPX^2 + XPY^2)}}$$

$$\sin\gamma = \frac{XPY}{\sqrt{(XPX^2 + XPY^2)}}$$

Fig. 6

$$Mzp = \begin{bmatrix} \cos\beta & , & 0 & , & \sin\beta \\ 0 & , & 1 & , & 0 \\ -\sin\beta & , & 0 & , & \cos\beta \end{bmatrix} \begin{bmatrix} \cos\alpha & , & \sin\alpha & , & 0 \\ -\sin\alpha & , & \cos\alpha & , & 0 \\ 0 & , & 0 & , & 1 \end{bmatrix}$$

$$= \begin{bmatrix} \cos\beta\cos\alpha , & \cos\beta\sin\alpha , & \sin\beta \\ -\sin\alpha , & \cos\alpha , & 0 \\ -\sin\beta\cos\alpha , & -\sin\beta\sin\alpha , & \cos\beta \end{bmatrix} \quad --- (3)$$

$$\cos\alpha = \frac{ZPX}{\sqrt{(ZPX^2 + ZPY^2)}}$$

$$\sin\alpha = \frac{ZPY}{\sqrt{(ZPX^2 + ZPY^2)}}$$

$$\cos\beta = \frac{ZPZ}{\sqrt{(ZPX^2 + ZPY^2 + ZPZ^2)}}$$

$$\sin\beta = \pm \frac{\sqrt{(ZPX^2 + ZPY^2)}}{\sqrt{(ZPX^2 + ZPY^2 + ZPZ^2)}}$$

$$= \begin{bmatrix} \cos\gamma, & \sin\gamma, & 0 \\ -\sin\gamma, & \cos\gamma, & 0 \\ 0, & 0, & 1 \end{bmatrix} \begin{bmatrix} \cos\beta\cos\alpha, & \cos\beta\sin\alpha, & \sin\beta \\ -\sin\alpha, & \cos\alpha, & 0 \\ -\sin\beta\cos\alpha, & -\sin\beta\sin\alpha, & \cos\beta \end{bmatrix}$$

$$= \begin{bmatrix} \cos\gamma\cos\beta\cos\alpha - \sin\gamma\sin\alpha, & \cos\gamma\cos\beta\sin\alpha + \sin\gamma\cos\alpha, & 0 \\ -\sin\gamma\cos\beta\cos\alpha - \cos\gamma\sin\alpha, & -\sin\gamma\cos\beta\sin\alpha + \cos\gamma\cos\alpha, & 0 \\ -\sin\beta\cos\alpha, & -\sin\beta\sin\alpha, & \cos\beta \end{bmatrix} \quad \text{---(4)}$$

Fig. 8

$$M_p^{-1} = \begin{bmatrix} \cos\alpha, & -\sin\alpha, & 0 \\ \sin\alpha, & \cos\alpha, & 0 \\ 0, & 0, & 1 \end{bmatrix} \begin{bmatrix} \cos\beta, & 0, & -\sin\beta \\ 0, & 1, & 0 \\ \sin\beta, & 0, & \cos\beta \end{bmatrix} \begin{bmatrix} \cos\gamma, & -\sin\gamma, & 0 \\ \sin\gamma, & \cos\gamma, & 0 \\ 0, & 0, & 1 \end{bmatrix}$$

$$= \begin{bmatrix} \cos\alpha, & -\sin\alpha, & 0 \\ \sin\alpha, & \cos\alpha, & 0 \\ 0, & 0, & 1 \end{bmatrix} \begin{bmatrix} \cos\beta\cos\gamma, & -\cos\beta\sin\gamma, & -\sin\beta \\ \sin\gamma, & \cos\gamma, & 0 \\ \sin\beta\cos\gamma, & -\sin\beta\sin\gamma, & \cos\beta \end{bmatrix}$$

$$= \begin{bmatrix} \cos\alpha\cos\beta\cos\gamma - \sin\alpha\sin\gamma, & -\cos\alpha\cos\beta\sin\gamma - \sin\alpha\cos\gamma, & -\cos\alpha\sin\beta \\ \sin\alpha\cos\beta\cos\gamma + \cos\alpha\sin\gamma, & -\sin\alpha\cos\beta\sin\gamma + \cos\alpha\cos\gamma, & -\sin\alpha\sin\beta \\ \sin\beta\cos\gamma, & -\sin\beta\sin\gamma, & \cos\beta \end{bmatrix} \quad \text{---}(5)$$

Fig. 9

$$\begin{bmatrix} x \\ y \\ z \end{bmatrix} = \begin{bmatrix} a \\ b \\ c \end{bmatrix} - 2K/L \begin{bmatrix} q1-p1 \\ q2-p2 \\ q3-p3 \end{bmatrix} \text{---(6)}$$

$$L = \sqrt{(q1-p1)^2 + (q2-p2)^2 + (q2-p2)^2}$$

$$K = \big[ (a-p1)(q1-p1) + (b-p2)(q2-p2) + (a-p1)(q1-p1) \big]$$

Fig. 11

$$x = \sqrt{2} \, R\sin\beta/2 \quad \text{---} \quad (7a)$$

$$y = R/2 - R\cos\beta/2 \quad \text{---} \quad (7b)$$

$$z = R/2 + R\cos\beta/2 \quad \text{---} \quad (7c)$$

$$\begin{bmatrix} X \\ Y \\ Z \end{bmatrix} = \begin{bmatrix} \cos\alpha, & \sin\alpha, & 0 \\ -\sin\alpha, & \cos\alpha, & 0 \\ 0, & 0, & 1 \end{bmatrix} \begin{bmatrix} x \\ y \\ z \end{bmatrix}$$

$$= \begin{bmatrix} x\cos\alpha + y\sin\alpha \\ -x\sin\alpha + y\cos\alpha \\ z \end{bmatrix}$$

$$= \begin{bmatrix} \sqrt{2}R\sin\beta \cos\alpha/2 + (R/2 - R\cos\beta/2)\sin\alpha \\ -\sqrt{2}R\sin\beta \sin\alpha/2 + (R/2 - R\cos\beta/2)\cos\alpha \\ R/2 + R\cos\beta/2 \end{bmatrix} \quad \text{---(8)}$$

Fig. 17

$$\begin{bmatrix} X_c \\ Y_c \\ Z_c \end{bmatrix} = \begin{bmatrix} \sqrt{2}R\sin\beta_c \cos\alpha_c/2 & (R/2 - R\cos\beta_c/2)\sin\alpha_c \\ -\sqrt{2}R\sin\beta_c \sin\alpha_c/2 & (R/2 - R\cos\beta_c/2)\cos\alpha_c \\ R/2 + R\cos\beta_c/2 & \end{bmatrix} \quad ---(9a)$$

$$\cos\beta_c = 2Z_c/R - 1 \quad ---(9b)$$

$$\sin\beta_c = \pm\sqrt{1-\cos^2\beta_c} \quad ---(9c)$$

$$\cos\alpha_c = \frac{R\{\sqrt{2}\sin\beta_c X_c + (1-\cos\beta_c)Y_c\}}{2(R^2 - Z_c^2)} = U_c \quad ---(9d)$$

$$\beta_c = \cos^{-1}(2Z_c/R - 1) \quad ---(9e)$$

$$\alpha_c = \cos^{-1}(U_c) \quad ---(9f)$$

THREE-DIMENSIONAL LASER COORDINATE TRANSFORMATION SYSTEM

This application is a continuation of application Ser. No. 07/862,532, filed as PCT/JP91/01414, Oct. 16, 1991, published as WO92/08172, May 14, 1992, now abandoned.

BACKGROUND OF THE INVENTION

1. Field of the Invention

The present invention relates to a three-dimensional laser coordinate transformation system for a three-dimensional laser machining apparatus, and more specifically, to a three-dimensional laser coordinate transformation system by which a space movement transformation or space mirror transformation can be made.

2. Description of the Related Art

A three-dimensional laser machining apparatus is employed for machining a three-dimensional model or the like because such an apparatus can machine a workpiece three-dimensionally with a high accuracy and at a high speed, without coming into contact therewith.

The three-dimensional laser machining apparatus is controlled by five axes, i.e., X-, Y- and Z-axes, and further, $\alpha$- and $\beta$-axes, for determining the attitude of a nozzle. More specifically, the X-, Y- and Z-axes determine a position of the extreme end of the nozzle, which is positioned perpendicular to the surface of a workpiece by the $\alpha$- and $\beta$-axes.

An example of such a control of the attitude of the nozzle is disclosed in Japanese Patent Application (Laid-Open) No. Hei 2-112891.

Further, in many cases, a machining program for the three-dimensional laser machining apparatus is provided with a coordinate system for each workpiece; this being determined from a particular point of the workpiece for carrying out a machining thereof. Therefore, the coordinate system employed by the machining program is different from a coordinate system of an actually set workpiece, and thus a coordinate transformation is necessary.

This coordinate transformation includes a space movement transformation by which a coordinate system having a three-dimensionally different distance and attitude is created, and a space mirror transformation by which a coordinate system symmetrical with respect to a particular plane is created.

Nevertheless, a numerical control apparatus (CNC) for controlling a three-dimensional laser machining apparatus cannot perform mirror transformations with respect to an arbitrary plane, although able to perform a mirror machining with respect to a particular plane (XY plane, YZ plane, XZ plane).

Furthermore, the numerical control apparatus does not have a function for performing a space movement transformation, and accordingly, a machining program must be created for each workpiece by an automatic program creation apparatus, after the position of the workpiece in machining has been measured, to thereby perform a space movement transformation or space mirror transformation.

Therefore, a problem arises in the use of the three-dimensional laser machining apparatus when a workpiece is to be machined in that the automatic program creation apparatus is needed at all times, and that a machining program must be created each time a workpiece is to be machined.

SUMMARY OF THE INVENTION

Taking the above into consideration, an object of the present invention is to provide a three-dimensional laser coordinate transformation system by which a space movement transformation and space mirror transformation can be carried out.

To attain the above object, according to the present invention, there is provided a three-dimensional laser coordinate transformation system of a three-dimensional laser machining apparatus for a coordinate transforming of a machining program, a preprocessing calculation unit for decoding the machining program and outputting a command value, a matrix calculation unit for calculating a coordinate transformation matrix for a coordinate transformation of the command value, a coordinate transformation unit for a coordinate transformation of the command value by using the coordinate transformation matrix, an interpolation unit for outputting an interpolation pulse by interpolating a transformed command value of the coordinate transformation unit, and servo motors driven in response to the interpolation pulse.

The above preprocessing calculation unit decodes the machining program and outputs a command value for each axis. The coordinate transformation unit transforms the command value to a command value on the coordinate system of an actual workpiece by using the coordinate transformation matrix, and the transformed coordinate command value is interpolated by the interpolation unit to output an interpolation pulse. Therefore, servo motors are driven in response to the interpolation pulse for a machining of the workpiece.

BRIEF DESCRIPTION OF THE DRAWINGS

FIG. 6 shown matrices and equations for a formula representing a transformation matrix obtained when a coordinate system P is rotated on the XY plane of a workpiece coordinate system;

FIG. 7 is a formula representing a transformation matrix obtained when a vector ZP is rotated on the XY plane of a workpiece coordinate system by $\beta$;

FIG. 8 is a formula representing a transformation matrix Mp for transforming a point on a coordinate system P to a workpiece coordinate system;

FIG. 9 is a formula representing an inverse transformation matrix $MP^{-1}$;

FIG. 11 shows formulas representing a transformation matrix for performing a space mirror transformation;

FIG. 17 is a formula representing the coordinate values of the extreme end point of the nozzle; and FIG. 18 shows formulas representing the relationship between the coordinate values of the nozzle vector that has been transformed and the rotational angles of $\alpha$- and $\beta$-axes.

DESCRIPTION OF THE PREFERRED EMBODIMENT

An embodiment of the present invention will be described below with reference to the drawings.

A three-dimensional machining apparatus must control the positioning of the coordinate system of a nozzle, and the attitude of the nozzle. Note, since a method of positioning a coordinate system is common to all numerically controlled machine tools, only a method of controlling a nozzle will be described herein.

Figure 2:
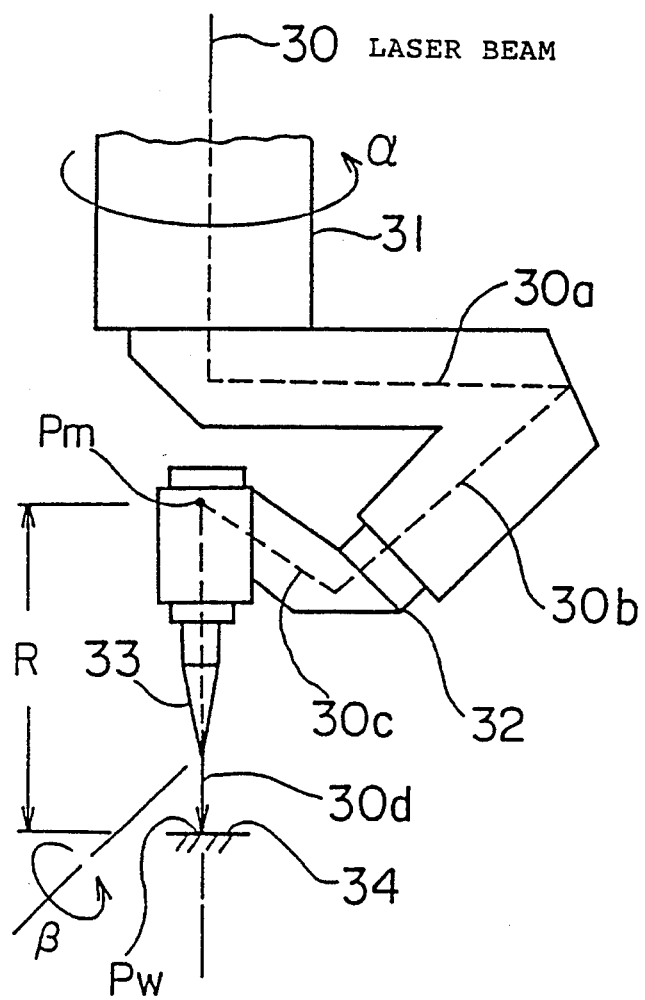
FIG. 2 is a partial side view of a nozzle of a three-dimensional laser machining apparatus.

FIG. 2 is a side view of a nozzle of a three-dimensional laser machining apparatus, wherein 30 designates a laser beam reflected by a not shown reflection mirror and irradiated onto a workpiece surface 34 as laser beams 30a, 30b, 30c and 30d; 31 designates a member for controlling an $\alpha$-axis horizontally rotated about the laser beam 30; 32 designates a rotational axis for controlling a $\beta$-axis; and 33 designates a nozzle. An attitude of the nozzle is controlled by controlling $\alpha$- and $\beta$-axes as shown in FIG. 2.

Figure 1:
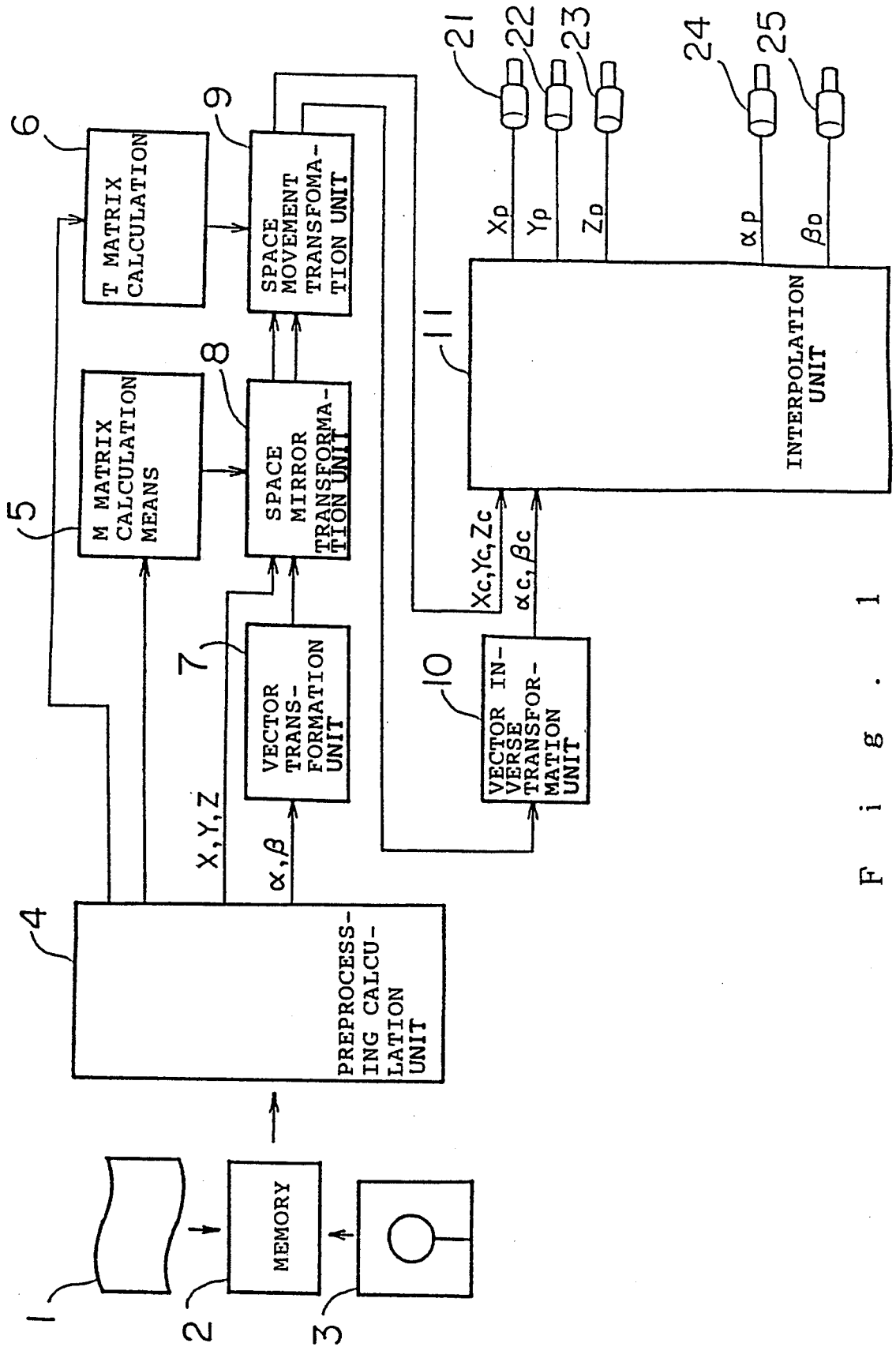
FIG. 1 is a block diagram of a three-dimensional laser coordinate transformation system according to the present invention.

FIG. 1 is a block diagram of a three-dimensional laser coordinate transformation system according to the present invention. A machining program is stored in a memory 2 from a paper tape 1 or floppy disk 3 and the memory 2 is accessed. The machining program read from the memory 2 is decoded by a preprocessing calculation unit 4 and divided into positional commands X, Y and Z for the nozzle, and commands $\alpha$ and $\beta$ for controlling the attitude of the nozzle.

The positional commands X, Y and Z are subjected to a space mirror transformation by a space mirror transformation unit 8. The space mirror transformation is performed by using a space mirror transformation matrix (M matrix) calculated by an M matrix calculation unit 5. This M matrix is used for a coordinate transformation of the positional commands to positions which are symmetrical with respect to the perpendicular bisector plane placed between a point from which the transformation is performed and a point to which the transformation is performed.

Further, the positional commands X, Y and Z are transformed to the coordinate system of a workpiece in a actual machining process, by a space movement transformation unit 9. This transformation is performed by a space movement transformation matrix (T matrix) calculated by a T matrix calculation unit 6. This T matrix can be determined from the points of the workpiece to be actually machined. The T matrix and means for calculating the T matrix will be described later in detail.

The positional commands X, Y and Z are subjected to a space mirror transformation and space movement transformation and the transformed positional commands Xc, Yc and Zc are supplied to an interpolation unit 11. The interpolation unit interpolates the transformed positional commands Xc, Yc and Zc, outputs interpolation pulses Xp, Yp and Zp, and drives the servo motors 21, 22, 23 of the X-, Y- and Z-axes, respectively, to thereby control the movement of the nozzle.

Note, the positional commands X, Y and Z obviously may be subjected to either or both space movement transformation and space mirror transformation.

Figure 3:
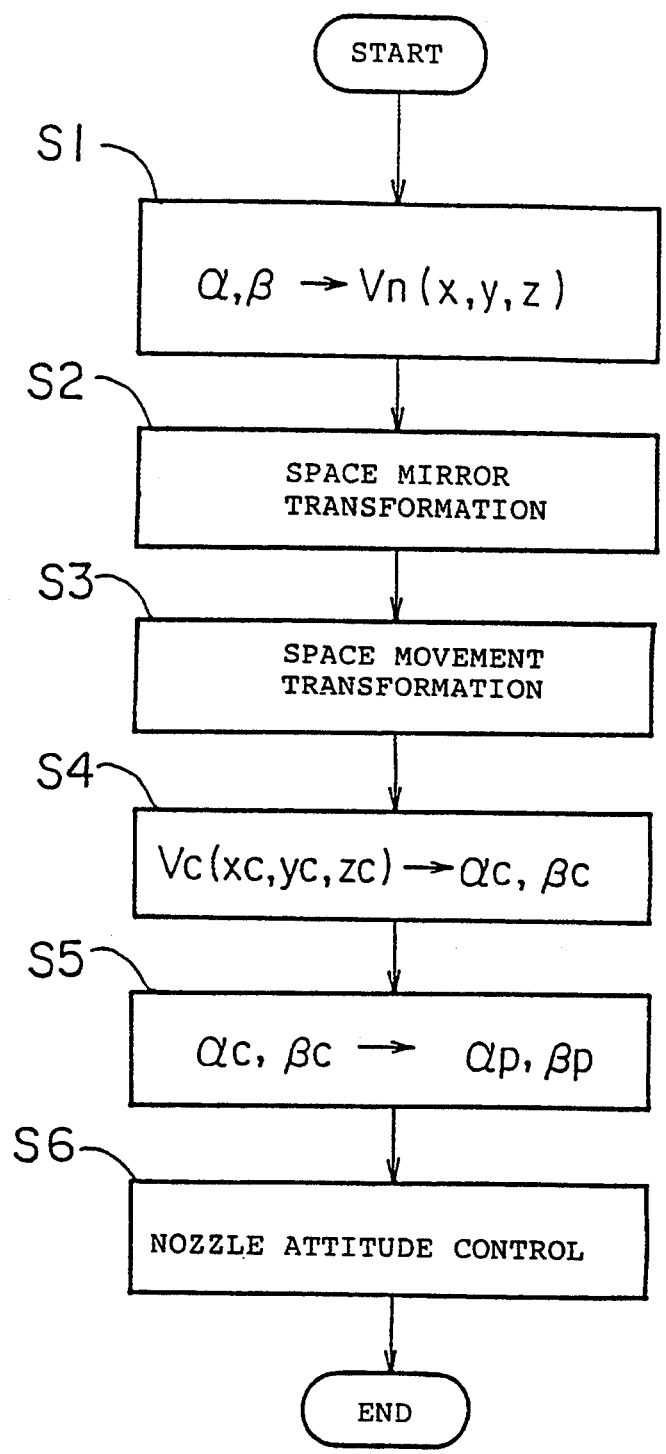
FIG. 3 is a flowchart showing a coordinate transformation processing performed by commands $\alpha$ and $\beta$.

Next, the coordinate transformation of the commands $\alpha$ and $\beta$ for controlling the attitude of the nozzle will be described. FIG. 3 is a flowchart showing a coordinate transformation processing of commands $\alpha$ and $\beta$, wherein numerals prefixed with S indicate the numbers of the steps of the process.

[S1] The commands $\alpha$ and $\beta$ for controlling the attitude of the nozzle are first transformed to the vector Vn of the nozzle by a vector transformation unit 7, and the coordinate values (x, y, z) of the extreme end of the vector are determined.

[S2] The coordinate values (x, y and z) are subjected to a space mirror transformation by the space mirror transformation unit 8, in the same way as for the positional commands.

[S3] Further, the coordinate values (x, y and z) are subjected to a space movement transformation by the space movement transformation unit 9.

[S4] The coordinate values (xc, yc, zc) obtained by the transformations in steps S1–S3, i.e. a vector Vc, transformed to obtain transformed commands $\alpha$c, $\beta$c by a vector inverse transformation unit 10.

[S5] The transformed commands $\alpha$c, $\beta$c are interpolated by the interpolation unit 11, and interpolation pulses $\alpha$p, $\beta$p are output.

[S6] The servo motors 24, 25 of the $\alpha$- and $\beta$-axes are driven in response to the interpolation pulses $\alpha$p, $\beta$p to thereby control the attitude of the nozzle.

Note, either or both space movement transformation and space mirror transformation may be performed in the above flowchart.

Figure 4:
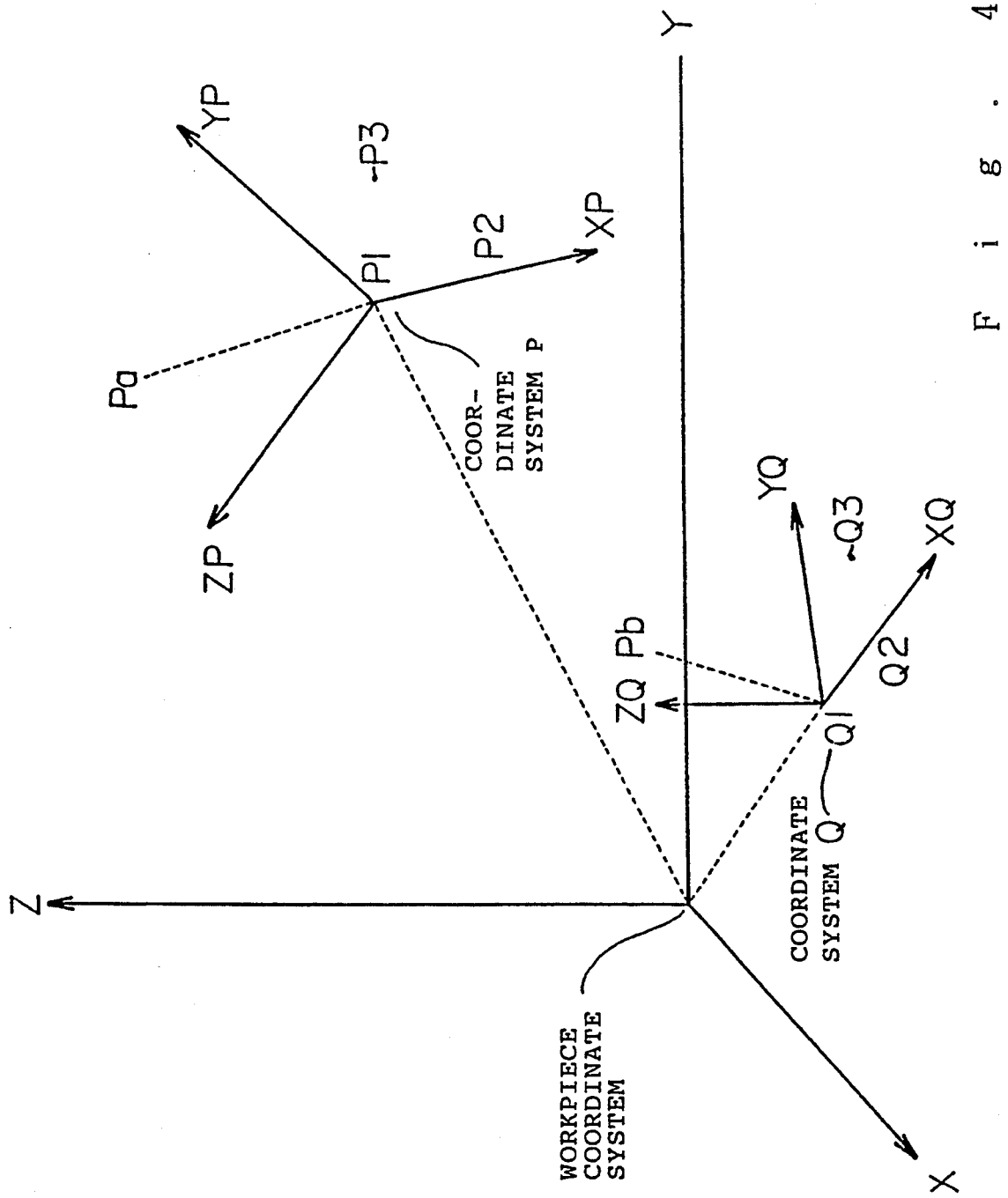
FIG. 4 is a three-dimensional graph explaining a space movement transformation.

Next, the space movement transformation will be described in detail. FIG. 4 is a diagram for explaining the space movement transformation. Here, the transformation of a point Pa on a coordinate system P to a point Pb on a coordinate system Q will be explained.

The coordinate system P is defined by the origin P1 on the coordinate system P, a point P2 on the XP axis of the coordinate system P, and a point P3 on the XP-YP plane thereof.

The coordinate system Q is defined by the origin Q1 on the coordinate system Q, a point Q2 on the XQ axis of the coordinate system Q, and a point Q3 on the XQ-YQ plane thereof.

First, the XP axis is determined from the points P1, P2, and a ZP axis is determined from the outer product of a vector (P1-P2) and a vector (P1-P3).

Next, a YP axis is determined from the outer product of the XP axis and ZP axis, using the coordinate system as a right-hand coordinate system.

A matrix Mp is used for transforming the thus determined coordinate system P (XP, YP, ZP) to a workpiece coordinate system (X, Y, Z), and in the same way, a matrix Mq is used for transforming the coordinate system Q to the workpiece coordinate system (X, Y, Z). Therefore, the following relationships are established.

$$Mq^{-1}Pb = Mp^{-1}Pa \qquad (1a)$$

$$Pb = MqMp^{-1}Pa \qquad (1b)$$

whereby the point Pa can be transformed to the point Pb.

In general, the coordinate system P is determined from a coordinate system when a machining program is created, and the coordinate system Q is determined from the specific points (Q1, Q2, Q3) of a workpiece when the workpiece is actually machined.

Figure 5:
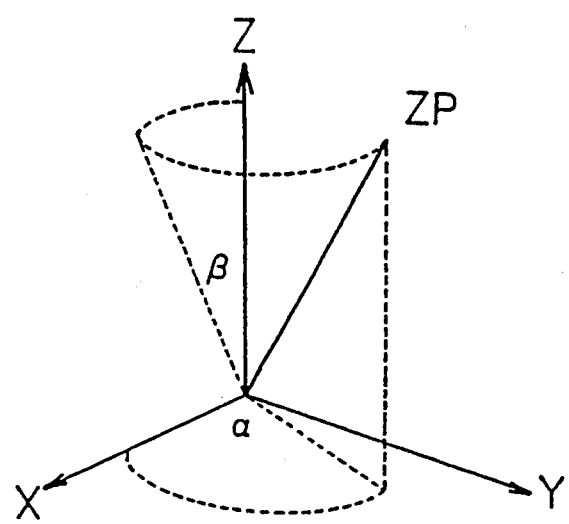
FIG. 5 is a matrix and equations used in explaining the determination of a transformation matrix Mp.

Next, a method of actually determining a transformation matrix will be described. FIG. 5 is a diagram for explaining the determination of the transformation matrix Mp. Note that a parallel movement component is not described here, to simplify the description, and thus only the rotation component of the coordinate system will be described.

The ZP axis of the coordinate system P is rotated by an angle α on the XY plane of the workpiece coordinate system, and further rotated by an angle β on the XZ plane thereof, so that the coordinate axes of the coordinate system P coincide with those of the workpiece coordinate system.

At this time, a coordinate transformation matrix Mxp obtained by the first rotation can be represented by a formula (2) of FIG. 6, where XPX, XPY are coordinate values of a vector ZP in the workpiece coordinate system.

Next, a transformation matrix obtained when the vector ZP is rotated by the angle β the XZ plane of the workpiece coordinate system can be represented by formula (3) of FIG. 7, where XPX, XPY, ZPZ are the coordinate values of the vector ZP in the workpiece coordinate system.

Therefore, the transformation matrix Mp for transforming a point on the coordinate system P to a point on the workpiece coordinate system can be represented by a formula (4) of FIG. 8.

The inverse matrix Mp$^{-1}$ is given by a formula (5) in FIG. 9 by inverting the transformation matrix Mp.

The transformation matrix Mq for transforming the point Pb on the coordinate system Q to a point on the workpiece coordinate system can be obtained in the same way.

A transformation matrix for transforming the point Pa on the coordinate system P to the point Pb on the coordinate system Q can be obtained from these transformation matrixes Mp$^{-1}$ and Mq by using the aforesaid formula (1b). This matrix is the space movement transformation matrix (T matrix) described with reference to FIG. 1.

Figure 10:
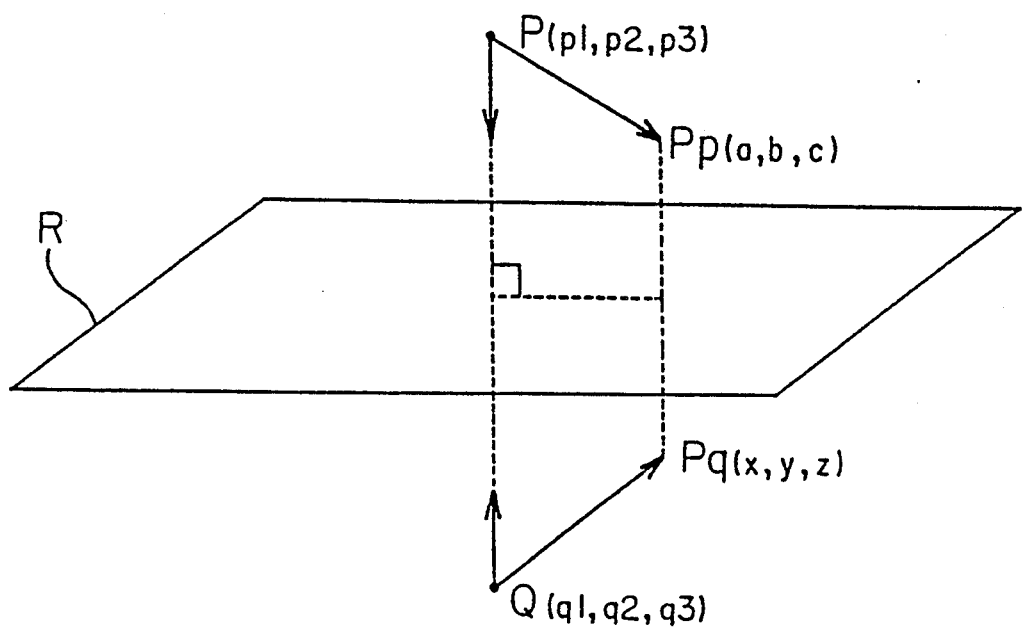
FIG. 10 is a three-dimensional graph for explaining a space mirror transformation.

Next, the space mirror transformation will be described. FIG. 10 is a diagram for explaining the space mirror transformation. A point from which the transformation is performed is transformed to a point Q with respect to a the plane R. The points P and Q are the same distance from the plane R which lies perpendicular to the line connecting the point P to the point Q. At this time, a point symmetrical to a point Pp with respect to the R is represented by Pq, i.e., the point Pq is a transformation point to be determined.

Assuming that the point P has coordinate values (p1, p2, p3), the point Q has coordinates values (q1, q2, q3), the point Pp has coordinate values (a, b, c), and the point Pq has coordinate values (x, y, the point Pq can be determined by formula (6) shown in FIG. 11.

Next, the transformation of the α- and β-axes for controlling the attitude of the nozzle will be described. Commands α and β are commands for controlling the attitude of the nozzle and cannot be directly subjected to a space movement transformation or space mirror transformation. Therefore, the command values α and β are first transformed into the vectors of the nozzle, the coordinate values of the extreme ends of the vectors are subjected to the space movement transformation or space mirror transformation, to obtain transformed vectors, and then transformed command values αc and βc are determined from the transformed vectors, to thereby control the nozzle by the transformed command values αc and βc.

Figure 13:
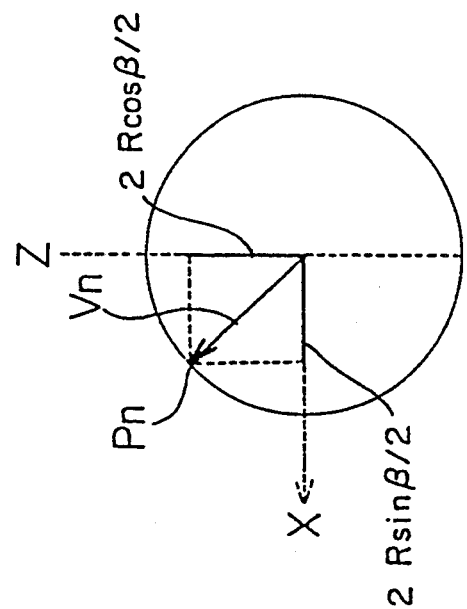
FIG. 13 is a two-dimensional diagram illustrating a position of the nozzle viewed from an arrow A of FIG. 12.
Figure 12:
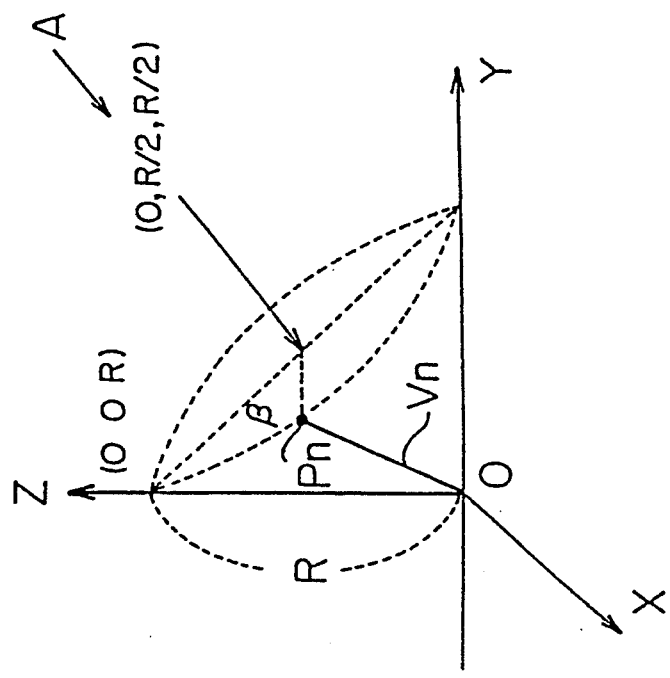
FIG. 12 is a three-dimensional diagram showing a vector of a nozzle when a $\beta$-axis is rotated by an angle $\beta$.
Figures 14, 15:
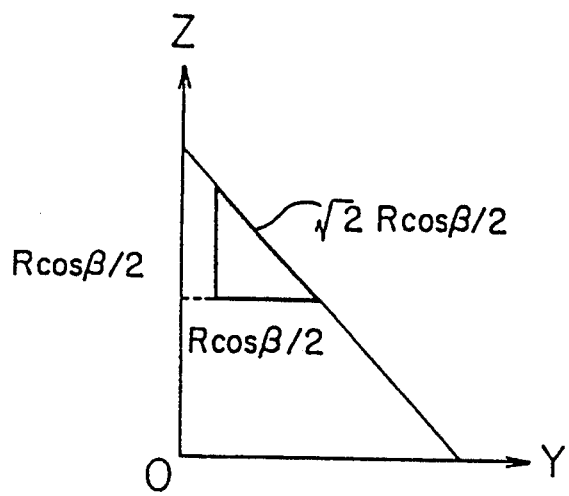
FIG. 14 is a two-dimensional diagram of the nozzle viewed from the direction of an X-axis of FIG. 12.
FIG. 15 is a diagram showing a formulas representing coordinate values of the extreme point of the nozzle.

FIG. 12 is a diagram showing a vector of the nozzle when the β-axis is rotated by an angle β; FIG. 13 is a diagram of the nozzle viewed from an arrow A of FIG. 12; and FIG. 14 is a diagram of the nozzle viewed from the direction of the X-axis of FIG. 12. When a distance of the nozzle from a point Pw on the workpiece to a point Pm shown in FIG. 2 is represented by R, and the coordinate values of the extreme end of the vector Vn of the nozzle obtained when the β-axis is rotated by the angle β are represented by (x, y, z), the coordinate values of the extreme end Pn of the vector Vn can be represented by the formulas (7a), (7b) and (7c) shown in FIG. 15, as apparent from FIGS. 12, 13 and 14.

Figure 16:
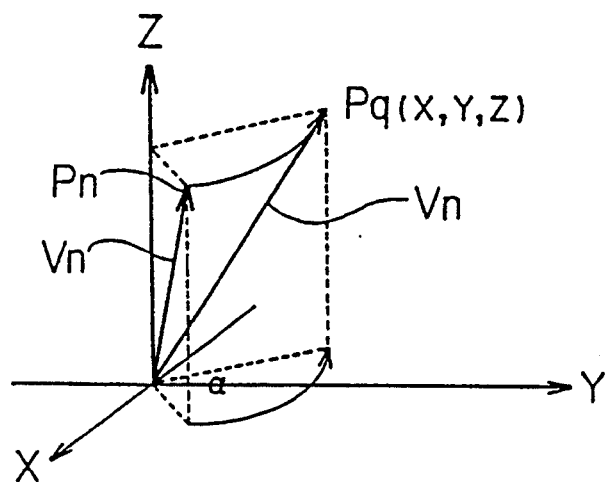
FIG. 16 is a three-dimensional diagram illustrating a position obtained when the nozzle is further rotated by an angle $\alpha$ about an $\alpha$-axis.

FIG. 16 is a diagram obtained when the nozzle is further rotated by an angle α about the α-axis, and the coordinate values (X, Y, Z) of the extreme end point Pq of the vector Vn at this time can be represented by formula (8) shown in FIG. 17.

The coordinate values (X, Y, Z) are subjected to the space movement transformation or space mirror transformation, as described above, and the coordinate values obtained after the transformation are represented by (Xc, Yc, Zc). Further, when rotational angles of the α- and β-axes corresponding to the coordinate values are represented by αc and βc, a formula (9a) shown in FIG. 18 can be established.

Therefore, the rotational angles αc and βc of the α- and β-axes after the transformation can be determined by the formulas (9e), (9f) shown in FIG. 18.

The attitude of the nozzle can be controlled in such a manner that the transformed command values αc, βc are interpolated and the servo motors of the α- and β-axes are driven in response to the interpolation pulses αp, βp.

Note that the above calculation formulas are only examples, therefore, obviously calculation formulas suitable for a numerical control apparatus (CNC) in use may be employed, depending upon the hardware thereof.

As described above, according to the present invention, since space movement transformation means and space mirror transformation means are provided in a numerical control apparatus, the coordinates of a machining program can be transformed without using a separate automatic program creation apparatus. Further, a machining program need not be created for each machining operation, and thus only data necessary for coordinate transformation need be input.

Further, since the α- and β-axes for controlling the attitude of the nozzle are also transformed in such a manner that the coordinate values of the extreme end of the vector of the nozzle are transformed and a commanded angle after the transformation is determined, the coordinates of the attitude of the nozzle can be simultaneously transformed.

I claim:

1. A three-dimensional laser coordinate transformation system for a three-dimensional laser machining apparatus by which coordinates of a machining program are transformed to drive servo motors, comprising:

preprocessing calculation means for decoding the machining program and outputting a command value having coordinates;

matrix calculation means for calculating a coordinate transformation matrix for transforming the coordinates of the command value;

coordinate transformation means for transforming the coordinates of the command value into a transformed command value using the coordinate transformation matrix;

interpolation means for outputting an interpolation pulse by interpolating the transformed command value output by said coordinate transformation means; and driving means for driving the servo motors in response to the interpolation pulse.

2. A three-dimensional laser coordinate transformation system for a three-dimensional laser machining apparatus by which coordinates of a machining program are transformed, comprising:

preprocessing calculation means for decoding the machining program and out-putting a command value having coordinates;

matrix calculation means for calculating a coordinate transformation matrix for transforming the coordinates of the command value, said matrix calculation means including at least one of space movement transformation matrix calculation means for calculating a space movement transformation matrix for performing a space movement transformation, and space mirror transformation matrix calculation means for calculating a space mirror transformation matrix for performing a space mirror transformation;

coordinate transformation means for transforming the coordinates of the command value into a transformed command value using the coordinate transformation matrix;

interpolation means for outputting an interpolation pulse by interpolating the transformed command value output by said coordinate transformation means; and servo motors driven in response to the interpolation pulse.

3. A three-dimensional laser coordinate transformation system for a three-dimensional laser machining apparatus by which coordinates of a machining program are transformed, comprising:

preprocessing calculation means for decoding the machining program and outputting a command value having coordinates;

matrix calculation means for calculating a coordinate transformation matrix for transforming the coordinates of the command value;

coordinate transformation means for transforming the coordinates of the command value into a transformed command value using the coordinate transformation matrix, said coordinate transformation-means including at least one of space movement transformation means for performing a space movement transformation and space mirror transformation means for performing a space mirror transformation;

interpolation means for outputting an interpolation pulse by interpolating the transformed command value output by said coordinate transformation means; and servo motors driven in response to the interpolation pulse.

4. A three-dimensional laser coordinate transformation system by which coordinates of a machining program are transformed for a three-dimensional laser machining apparatus having a laser output nozzle, said three-dimensional laser coordinate transformation system comprising:

preprocessing calculation means for decoding the machining program and outputting a command value having coordinates for $\alpha$- and $\beta$-axes for controlling the laser output nozzle of the three-dimensional laser machining apparatus;

matrix calculation means for calculating a coordinate transformation matrix for transforming the coordinates of the command value;

vector transformation means for determining a vector representing the laser output nozzle and extreme end coordinate values of the laser output nozzle from the coordinates for the $\alpha$- and $\beta$-axes;

coordinate transformation means for transforming the coordinates of the command value into a transformed command value using the coordinate transformation matrix and for transforming the vector representing the laser output nozzle and extreme end coordinate values of the laser output nozzle into transformed extreme end coordinate values;

vector inverse transformation means for performing an inverse transformation of the transformed extreme end coordinate values, obtained by said coordinate transformation means, to produce the transformed command values of the $\alpha$- and $\beta$-axes;

interpolation means for outputting an interpolation pulse by interpolating the transformed command value output by said coordinate transformation means; and servo motors driven in response to the interpolation pulse.

5. A three-dimensional laser coordinate transformation system according to claim 2, wherein said space movement transformation matrix is a coordinate transformation matrix by which a first coordinate system determined by three reference points defined by the machining program is transformed into a second coordinate system determined by three points of a workpiece.

6. A three-dimensional laser coordinate transformation system according to claim 2, wherein said space mirror transformation matrix is a transformation matrix by which a first point defined by the machining program is converted into a second point symmetrical with respect to a perpendicular bisector plane between each point including the first point, from which transformation is performed and each point, including the second point, to which transformation is performed.

* * * * *